(12) United States Patent
Rosefsky (10) Patent No.: US 8,350,400 B2
(45) Date of Patent: Jan. 8, 2013

(54) RIBBON DRIVE POWER GENERATION AND METHOD OF USE

(75) Inventor: Jonathan B. Rosefsky, Wynnewood, PA (US)

(73) Assignee: HydroCoil Power, Inc., Reston, VA (US)

( * ) Notice: Subject to any disclaimer, the term of this patent is extended or adjusted under 35 U.S.C. 154(b) by 0 days.

(21) Appl. No.: 13/422,483

(22) Filed: Mar. 16, 2012

(65) Prior Publication Data

US 2012/0175881 A1 Jul. 12, 2012

Related U.S. Application Data

(63) Continuation of application No. 12/497,334, filed on Jul. 2, 2009, now Pat. No. 8,148,839.

(60) Provisional application No. 61/077,696, filed on Jul. 2, 2008.

(51) Int. Cl.
*F01D 15/10* (2006.01)
*F02C 6/00* (2006.01)
*H02K 7/18* (2006.01)
*H02P 9/04* (2006.01)
*F03B 13/10* (2006.01)
*F03B 13/12* (2006.01)

(52) U.S. Cl. .......... 290/52; 290/53; 415/60; 415/66; 415/72; 416/122; 416/189; 417/53

(58) Field of Classification Search ............ 290/52, 290/53; 415/60, 66, 72; 416/122, 189; 417/53
See application file for complete search history.

(56) References Cited

U.S. PATENT DOCUMENTS

| 4,963 A | 2/1847 | Armstrong et al. | 416/189 |
|---|---|---|---|
| 85,508 A | 1/1869 | Beach et al. | 416/132 R |
| 1,631,069 A | 5/1927 | Smith | 415/75 |
| 1,816,971 A | 8/1931 | Hoff et al. | 415/75 |
| 2,334,302 A | 11/1943 | Akins | 415/75 |
| 2,568,903 A | 9/1951 | Vassar | 440/48 |
| 3,071,194 A | 1/1963 | Geske | 60/698 |
| 3,818,703 A | 6/1974 | Lapeyre | 60/504 |
| 3,818,704 A | 6/1974 | Lapeyre | 60/504 |

(Continued)

FOREIGN PATENT DOCUMENTS

EP 0445855 B1 10/1994

(Continued)

OTHER PUBLICATIONS

International Search Report and Written Opinion of the International Searching Authority in PCT/US2010/040773, mailed Feb. 23, 2011.

*Primary Examiner* — Pedro J Cuevas
(74) *Attorney, Agent, or Firm* — The Marbury Law Group, PLLC (57) ABSTRACT

The ribbon drive generation apparatus is comprised of a ribbon-like curved shape, composed either of metal or other suitable material, attached to a containment tube, peripheral rings, shaft, or porous central tube, with the complete apparatus being contained in a tube having a constant diameter for the length of the tube. The ribbon can be peripherally mounted to the containment tube and optionally to a central porous tube. In this form the containment tube rotates and can form part of a rotor for a generator apparatus. The optional central porous tube can also be used as a bearing surface or, if attached to the inside edge of the ribbon, a power take-off shaft.

30 Claims, 6 Drawing Sheets

U.S. PATENT DOCUMENTS

| | | | | |
|---|---|---|---|---|
| 3,924,966 | A | 12/1975 | Taminini | 416/177 |
| 3,980,527 | A | 9/1976 | Lapeyre | 202/175 |
| 4,039,849 | A | 8/1977 | Mater et al. | 290/55 |
| 4,086,026 | A | 4/1978 | Tamanini | 416/176 |
| 4,218,175 | A | 8/1980 | Carpenter | 415/219.1 |
| 4,313,404 | A | 2/1982 | Kossel | 123/56.5 |
| 4,384,212 | A | 5/1983 | Lapeyre | 290/53 |
| 4,412,417 | A | 11/1983 | Dementhon | 60/497 |
| 4,443,708 | A | 4/1984 | Lapeyre | 290/53 |
| 4,464,579 | A | 8/1984 | Schwarz | 290/44 |
| 4,481,020 | A | 11/1984 | Lee et al. | 96/214 |
| 4,500,259 | A | 2/1985 | Schumacher | 416/122 |
| 4,636,707 | A | 1/1987 | Law | 322/35 |
| 4,708,592 | A | 11/1987 | Krolick et al. | 416/176 |
| 4,717,832 | A | 1/1988 | Harris | 290/43 |
| 4,849,647 | A | 7/1989 | McKenzie | 290/54 |
| 5,121,819 | A | 6/1992 | Tecza | 188/306 |
| 5,139,391 | A | 8/1992 | Carrouset | 415/74 |
| 5,313,103 | A | 5/1994 | Hickey | 290/54 |
| 5,324,177 | A | 6/1994 | Golding et al. | 417/423.1 |
| 5,386,146 | A | 1/1995 | Hickey | 290/55 |
| 5,451,137 | A | 9/1995 | Gorlov | 415/7 |
| 5,642,984 | A | 7/1997 | Gorlov | 416/176 |
| 5,731,649 | A * | 3/1998 | Caamano | 310/216.047 |
| 5,814,914 | A * | 9/1998 | Caamano | 310/216.047 |
| 5,903,082 | A * | 5/1999 | Caamano | 310/216.001 |
| 5,945,899 | A * | 8/1999 | Leupold | 335/210 |
| 5,951,262 | A | 9/1999 | Hartman | 417/356 |
| 5,986,378 | A * | 11/1999 | Caamano | 310/216.047 |
| 6,000,915 | A | 12/1999 | Hartman | 417/356 |
| 6,036,443 | A | 3/2000 | Gorlov | 416/176 |
| 6,049,197 | A * | 4/2000 | Caamano | 322/89 |
| 6,154,013 | A * | 11/2000 | Caamano | 322/89 |
| 6,259,233 | B1 * | 7/2001 | Caamano | 322/89 |
| 6,357,997 | B1 | 3/2002 | Rosefsky | 415/60 |
| 6,357,998 | B1 | 3/2002 | Rosefsky | 415/66 |
| 6,407,466 | B2 * | 6/2002 | Caamano | 290/52 |
| 6,431,926 | B1 | 8/2002 | Rosefsky | 440/48 |
| 6,527,520 | B2 | 3/2003 | Rosefsky | 417/53 |
| 6,592,335 | B2 | 7/2003 | Rosefsky | 417/53 |
| 6,626,638 | B2 | 9/2003 | Rosefsky | 415/4.3 |
| 7,018,170 | B2 | 3/2006 | Rosefsky | 415/72 |
| 7,044,711 | B2 | 5/2006 | Duncan | 416/198 R |
| 7,600,963 | B2 | 10/2009 | Miller | 415/4.3 |
| 7,728,454 | B1 | 6/2010 | Anderson | 290/54 |
| 7,911,074 | B2 | 3/2011 | Anderson | 290/54 |
| 7,938,622 | B2 | 5/2011 | Anderson | 416/6 |
| 2001/0024075 | A1 * | 9/2001 | Caamano | 310/254 |
| 2002/0064465 | A1 | 5/2002 | Rosefsky | 417/53 |
| 2002/0150465 | A1 | 10/2002 | Rosefsky | 415/66 |
| 2004/0033142 | A1 | 2/2004 | Rosefsky | 417/53 |
| 2005/0074322 | A1 | 4/2005 | Duncan | 415/2.1 |
| 2007/0041823 | A1 | 2/2007 | Miller | 415/4.1 |
| 2007/0179015 | A1 | 8/2007 | Johnson et al. | 477/8 |
| 2008/0292478 | A1 | 11/2008 | Baykut et al. | 417/420 |
| 2009/0146430 | A1 | 6/2009 | Sear | 290/54 |
| 2010/0278650 | A1 | 11/2010 | Parker | 416/176 |
| 2011/0285134 | A1 | 11/2011 | Ortiz et al. | 290/52 |
| 2011/0286770 | A1 | 11/2011 | Hayashi et al. | 399/254 |
| 2011/0318045 | A1 | 12/2011 | Terai et al. | 399/100 |
| 2012/0007362 | A1 | 1/2012 | Bannister | 290/44 |
| 2012/0017559 | A1 | 1/2012 | Buchko | 59/249 |

FOREIGN PATENT DOCUMENTS

EP  0671563 A1  9/1995

* cited by examiner

FIG. 8B

RIBBON DRIVE POWER GENERATION AND METHOD OF USE

RELATED APPLICATIONS

This application is a continuation of U.S. patent application Ser. No. 12/497,334, filed Jul. 2, 2009, entitled "Ribbon Drive Power Generation and Method of Use," which is hereby incorporated by reference. This application claims the benefit of U.S. Provisional Application Ser. No. 61/077,696, filed Jul. 2, 2008, which is hereby incorporated by reference.

BACKGROUND

Disclosed embodiments relate generally to an apparatus and method for producing power using a ribbon drive mechanism. More particularly, embodiments include a ribbon drive electrical power generator apparatus and method, including those with a peripherally-attached ribbon and central screen, as well as methods of using alternative fluids for power generation and methods and apparatus related to a generator assembly for use with such ribbon drive electrical power generation methods and apparatus.

The present inventor's prior U.S. patents disclose various ribbon drive systems, including U.S. Pat. No. 6,357,997, which discloses a ribbon drive power generation system and its use in a hydroelectric peak shaving system, U.S. Pat. No. 6,626,638, which discloses a ribbon drive power generator that allows additional applications, such as use in free flowing currents and use in variable flow environments, and U.S. Pat. Nos. 6,592,335 and 6,431,926, which disclose ribbon drive pumping and propulsion systems with a peripherally-mounted ribbon.

DETAILED DESCRIPTION

Figure 1:
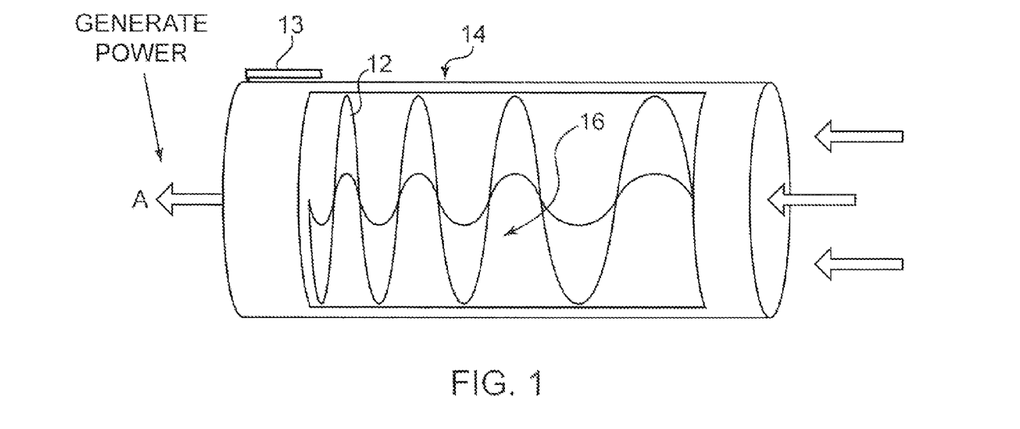
FIG. 1 illustrates the peripheral design for power generation system.

Referring to FIG. 1, the peripheral design is illustrated in which the ribbon 12 is attached at an outer edge to the containment tube 14. The ribbon drive generator apparatus consists of a ribbon-like curved shape vane 12, composed of metal or other suitable material, attached to the interior periphery of a spinning containment tube 14 or a series of peripheral rings having a constant diameter for the length of the containment tube 14. Fluid flows through the generating apparatus in the direction of the arrows and contacts the ribbon or vane 12, causing the entire containment tube 14 to rotate or spin. Magnets attached to the rotating containment tube 14 or to rotating peripheral rings or other such rotor structures at 13 are thus rotated as part or a generator structure to generate electricity. Structure 13 may also take the form of a power take-off pulley or gear surface on an exterior of the tube. The stator and field coil windings can be attached to a fixed, stationary outer cylinder. In such an embodiment, roller bearings, magnetic non-contact bearings, or other methods maintain a low or zero friction separation of outer fixed and inner rotating cylinder, rings or tube.

Fluid passed through the tube can be virtually any fluid, including but not limited to fluid passed through the tube that is selected from the group consisting of fluids that are liquids only when pressurized, and liquids not requiring pressurization such as but not limited to hydrocarbons, fuels, milk, whey, blood, blood plasma, and silicone.

A characteristic of the ribbon or vane 12 is that there is a change in the frequency of curves of the ribbon, which proceeds from a low frequency (few coils per unit length) at the leading portion of the apparatus to a high frequency (many coils per unit length) at the trailing portion of the apparatus. The apparatus looks similar to a corkscrew but has a decreasingly stretched frequency of coils as one proceeds down the length of the ribbon. For example, in appearance, at the intake point for the fluid, the ribbon or vane 12 would present a gradual curve at an angle of approximately 30 degrees to the axial flow of the incoming fluid and changing/progressing to a tightly curved angle at the exit point for the fluid, with said angle being steep (low pitch) but not perpendicular to the flow of fluid passing through the apparatus and thereby reducing the axial velocity of the fluid passing through the apparatus (these angles are not meant as a limitation to the apparatus since other angles may prove to be beneficial). However, said reduction in velocity of the fluid is countered to some degree by the venturi effect of a narrowing channel as the coil angle becomes steeper (higher frequency of coils, shorter axial distance for each subsequent 360 degrees of a coil). This effect of a narrowing channel becomes more obvious when plural ribbons are incorporated (see, e.g., FIG. 5).

This reduction of axial velocity of the fluid is a consequence of a transfer of energy from the fluid to the apparatus, thus turning the ribbon 12. The containment tube 14 prevents loss of energy to the sides as would be the case with a typical open hydraulic turbine type design. A central opening 16 allows fluid to pass through the apparatus unobstructed to maintain desired fluid flow and to help prevent excessive internal buildup of pressure that might impede fluid flow. In this manner, the apparatus will only receive or bleed off part of the fluid energy.

Figure 2:
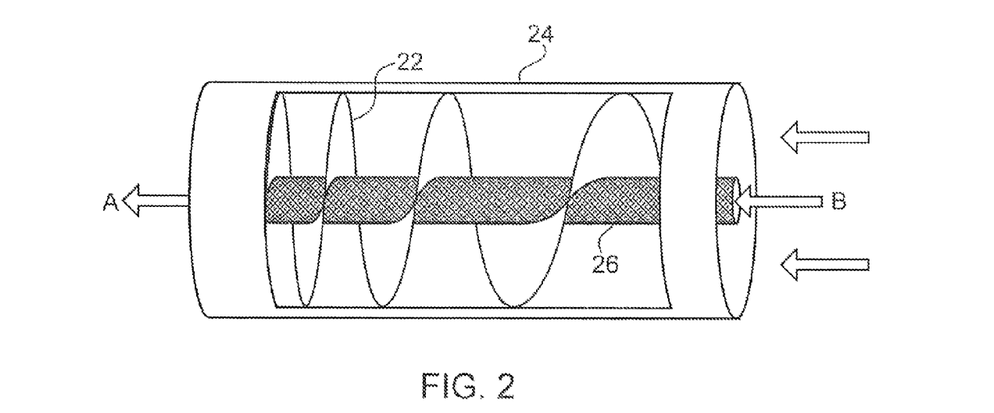
FIG. 2 illustrates another embodiment of a ribbon or coil assembly useful with the power generation system.

FIG. 2 illustrates another embodiment, again with ribbon or vane 22 and containment tube 24. In this embodiment, element 26 can be a power take-off shaft, with ribbon 22 attached at an inside edge to the element 26, or it can be a porous tube as part of a peripheral design. In this embodiment, porous tube 26 can either be attached to the inside edge of ribbon 22, where it can further act as a power take-off shaft, or it can be stationary, possibly acting as a filter and/or bearing surface for rotation of ribbon 12. Further, the ribbon 22 can be attached as well both to the inner edge of a rotating containment tube element 24, or to peripheral rings linked in such a way as to stabilize the rotating ribbon 22 at an outside edge of the ribbon or vane, and attached to a central shaft or porous tube at an inside edge of element 26.

When used as a power take-off shaft, element 26 can be attached to and used to power any of a number of means of electrical generation. Power could be transmitted from the shaft to the means of electrical generation by the use of gears, pulleys, belts, or a continuously variable transmission (in place of 832 and 834 in FIG. 8A) or any variety of combinations of techniques, or by electrical power induction from the peripheral vane edges utilizing methods such as, but not limited to, magneto-electric induction, with magnets on the vane outer edges, and with stator(s) and coils on the outside of the fixed outer containment cylinder, such as illustrated below in FIG. 7A.

Figure 3:
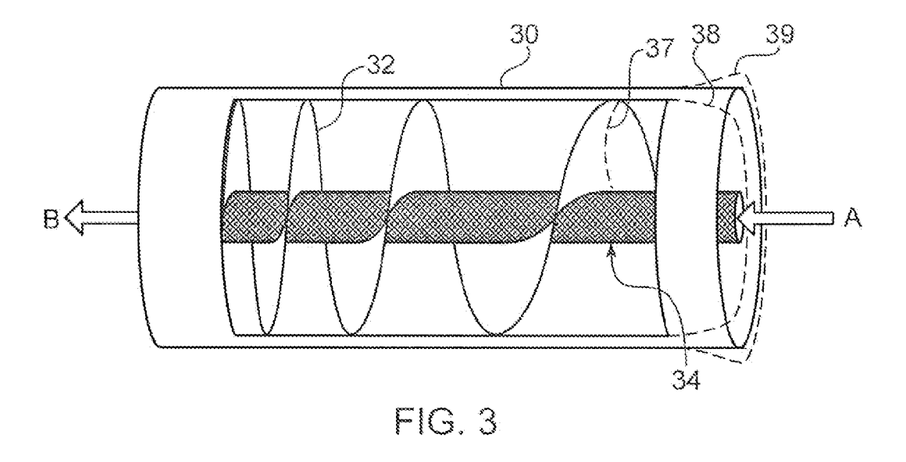
FIG. 3 illustrates another embodiment or a ribbon or coil assembly useful with the power generation system.

Referring to FIG. 3, the apparatus interior design is illustrated. The porous tube 34 has a ribbon 32 attached to it. Visually, this representation appears much like the thread of a screw attached to a central core. The ribbon rotates within a containment tube 30, to which it is attached at the interior periphery (i.e., the inner surface) of containment tube 30. Fluid flows through the power generation system in the direction of the arrows as the entire corkscrew-like design rotates along with the containment tube 30.

Fluid initially enters the containment tube 30 at point A and encounters the low frequency coils, which present a gradual curve of approximately 30 degrees to the axial flow of the incoming water. The ribbon changes, progressing to a tightly curved, steep angle (high frequency coil) at the exit point for the water, with said angle at this point B at a steep angle (low pitch) but not perpendicular to the flow of water passing through the apparatus and thereby further reducing the velocity of the water passing through the apparatus.

As before, the reduction of velocity of the fluid is a consequence of a transfer of energy from the fluid to the apparatus, thus turning the porous tube 34, ribbon 32 and containment tube 30 of the apparatus. Rotation of the ribbon-like apparatus is initiated at the low-frequency coil, with energy incrementally transferred as fluid, hitting the initial low frequency coil, sets the apparatus spinning slowly, progressing gradually to higher frequency coils which additionally convert energy of the linear axial velocity component of water to rotational energy. Due to the narrowing channel(s) through which water passes en route to the exit, there is a tendency for water velocity to increase by the venturi effect with a consequent boost in the rotational speed by the time the initially slowed water finally contacts the terminal high frequency, tightly-curved coil where further energy transfer occurs. If the terminal high frequency, steepest coil is at too close to vertical, it will act as a wall and water transit will cease, resulting in standstill and therefore should be avoided.

The porous tube 34 of the apparatus, which can be formed of screen material, operates to allow a portion of fluid to pass through the apparatus, generally to maintain fluid flow and to help prevent internal pressures from becoming too high. If attached to the ribbon 32, the tube 34 of the apparatus could be attached to and used to power any of a number of means of electrical power generation. In this manner, power could be transmitted from the central axle 34 of the power generation apparatus to the means of electrical power generation by the use of gears, pulleys, belts, continuously variable transmission or any of a variety of combinations of techniques. Alternatively, the system could be configured to directly induce electricity as a rotor element with magnets, stators and electrical coil windings, although this is still considered a "generator means" for the purposes of this disclosure.

The curved ribbon may be cupped 37 and made of metal, plastic, composite or other sturdy material. The frequency of the ribbon may be fixed (static) or variable (dynamic or adjustable). It can be made variable by segmenting the ribbon into a contiguous length of hinged, interlocking, or overlapping blades, which are movable by reason of linkages or sliding splines (or other means to those skilled in the art) along the length of the ribbon band, or by linear elongation or contraction of the coiled ribbon vane element. The innermost central edge of the ribbon can be attached to the porous tube, which can include tubular sections that slide longitudinally or include slots within which the innermost edge attachment of the ribbon can be adjusted to slide, or by other methods. The material of the ribbon can have limited but finite flexibility/extensibility, to permit adjustment as the flow source varies. The tube 30 can also have small portions 38, 39 of varying diameter at the intake or outlet end.

Figure 4:
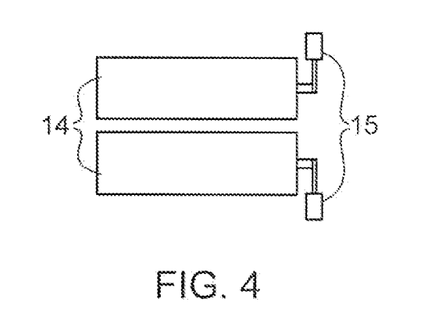
FIG. 4 illustrates a plural generator embodiment.
Figure 5:
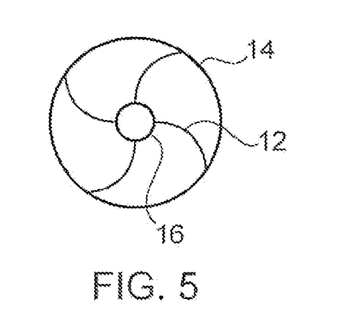
FIG. 5 illustrates a plural ribbon embodiment of a ribbon or coil assembly useful with the power generation system.

Referring to FIG. 4, plural ribbon drive apparatuses (of which tube 14 is visible) can be used to drive generators 15, either in parallel or in series. Additionally, each apparatus can have plural ribbons 12 equally spaced on the interior circumference of the tube 14, as illustrated in FIG. 5.

Figure 6A:
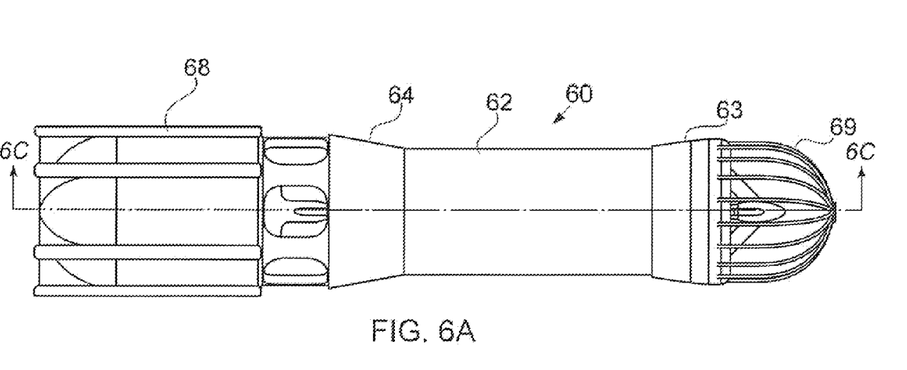
FIGS. 6A-6E illustrate various views elan embodiment of a ribbon drive electrical power generation unit.
Figure 6B:
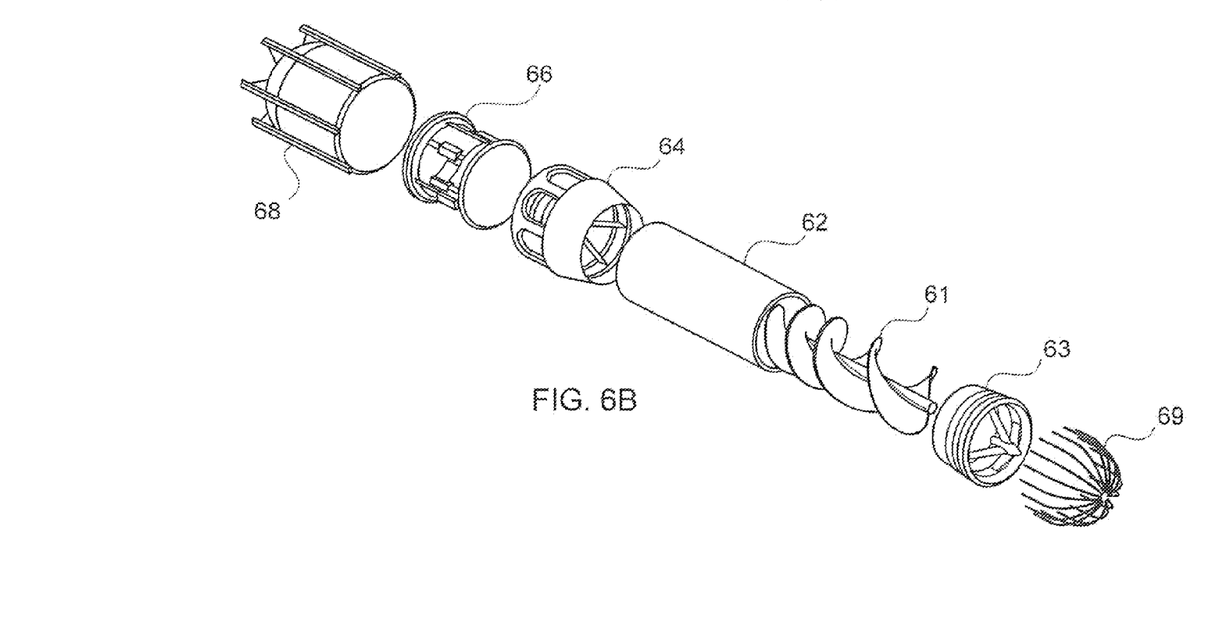
Figure 6C:
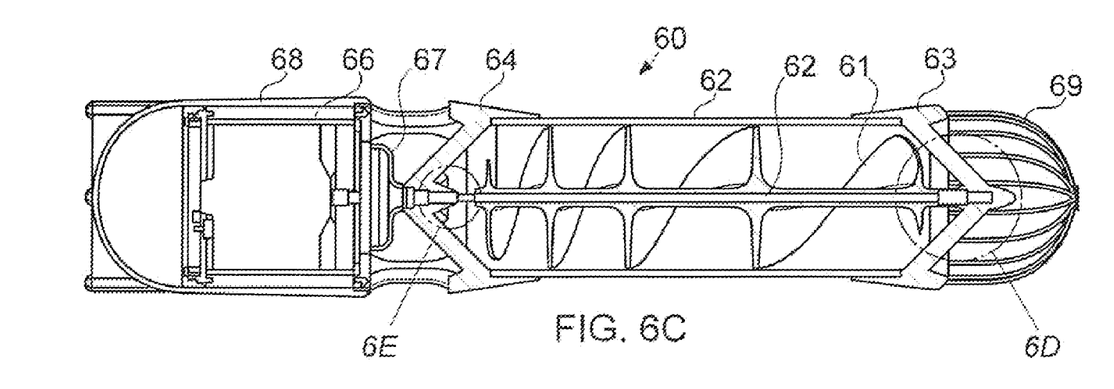
Figure 6D:
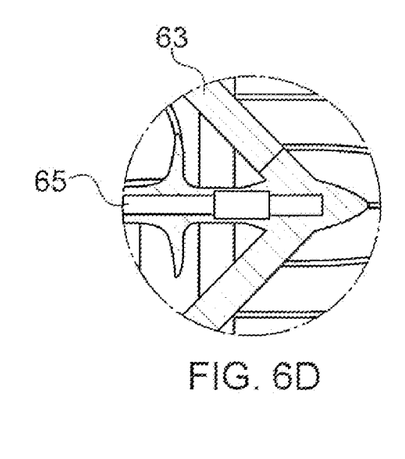
Figure 6E:
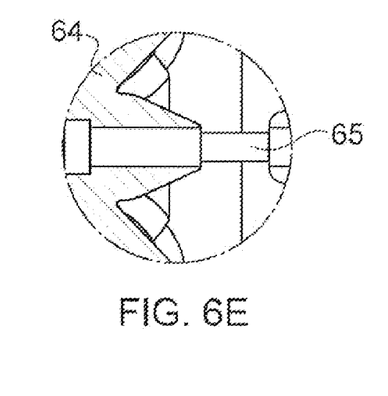

Referring to FIG. 6A-6E, an embodiment of a ribbon drive electrical power generator is illustrated in FIG. 6A, with corresponding FIG. 6B illustrating an exploded view of the embodiment, corresponding FIG. 6C illustrating a sectional view of the embodiment, and FIGS. 6D and 6E providing detail views of portions of FIG. 6C.

The ribbon drive electrical power generator assembly 60 is illustrated in FIGS. 6A-C. The ribbon drive electrical power generator assembly 60 has a ribbon or coil 61 that is inserted into containment tube 62. The containment tube 62 preferably has threads on the outside of the ends (e.g., standard NPT or NTP threads) for connection to corresponding threads on forward collar 63 and aft collar assembly 64. The outer edge of the forward collar can be flared outward to augment fluid entry. The exit edge of the aft collar can be flared outward to facilitate turbine water exit and to help prevent ambient water from flowing inward toward the turbine exit openings. As illustrated in FIGS. 6E and 6F, forward collar 63 and aft collar assembly 64 include bearings for rotational mounting of the ribbon or coil 61 via its central shaft 65. While forward collar 63 only requires a bearing and an open structure for the inlet of fluid, aft collar assembly 64 further needs to couple shaft 65 to the generator assembly 66, preferably via a coupling to a magnetic clutch 67, and has peripheral openings to allow the fluid to exit the assembly 60.

Figure 8A:
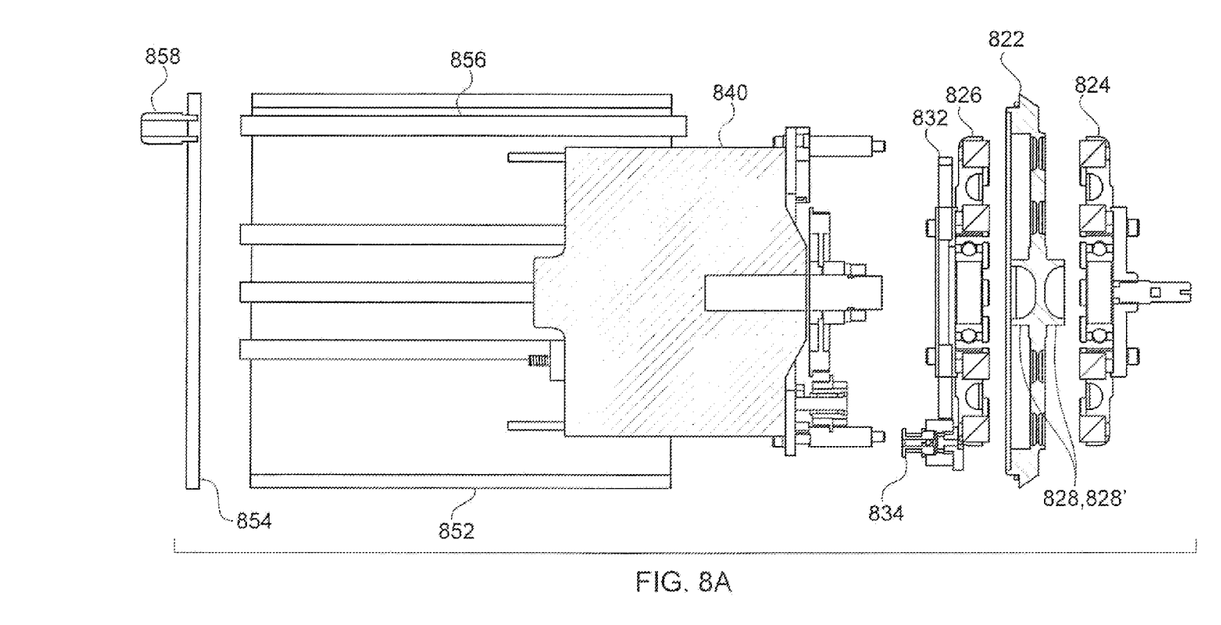
FIGS. 8A-8B illustrate an embodiment of a water-tight power management assembly useful with the power generation system.

The magnetic clutch 67 is part of a generator assembly 66 that can further include reduction gearing and a generator or alternator (permanent magnet or otherwise) generating electricity (element 840 as further disclosed in FIG. 8A). While the generator assembly can have its own integral outer housing, in the disclosed example, a rear shroud 68 encloses the generator assembly and supporting attachments 66 to act as an outer housing and attaches to the rear collar assembly 64. The shroud 68 can also include stabilization fins for use in free flowing areas or aligned weight-bearing surfaces for cooperating with an outer bearing surface on the forward collar 63 for use in appropriately-sized conduits. When used in a conduit, the standoff from the bearing surfaces on shroud 68 should be sufficient to allow continued acceptable flow of the fluid exiting the aft collar assembly 64 and passing around the forward, outside clutch assembly 67.

The forward collar 63 preferably uses low-drag supports for positioning and support of the central bearing and is largely open so as to allow the free flow of fluid into the containment tube 62. However, in order to prevent fouling or damage to the coil 61, a grill 69 may be used to cover the opening in forward collar 63. The grill 69 can attach in any suitable manner (such as snapping or screwing onto collar 63), but is preferably removable for servicing the assembly 60. The grill 69 is also preferably shaped to deflect debris away from the assembly to avoid undesirable blockage of the fluid flow.

In use, the assembly 60 can be made in various sizes and from various materials, dependent on the end application. For example, for use in conduits, such as to draw power from water running in pipes, the assembly can be sized in accordance with the conduit/pipe diameter.

Figure 7A:
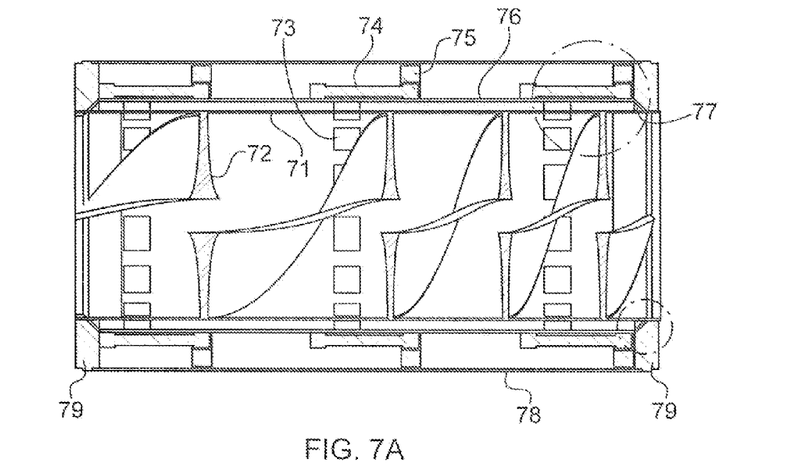
FIGS. 7A-7C illustrate various views of an embodiment of a ribbon drive power generation system.
Figure 7B:
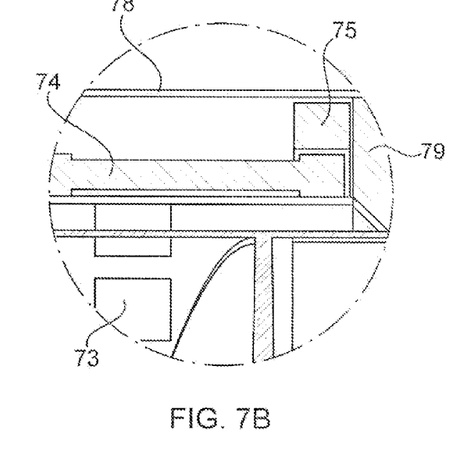
Figure 7C:
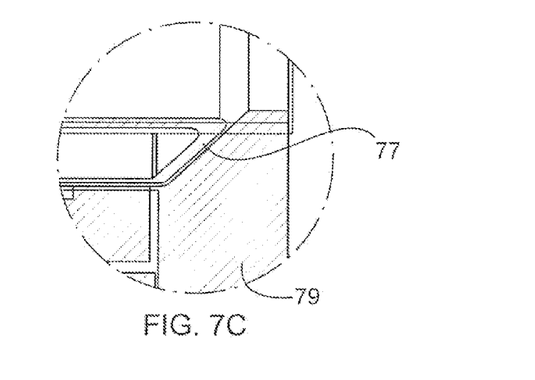

Referring to FIG. 7A, another embodiment of generator assembly is disclosed. FIG. 7A illustrates sectional view of the unit with a sealed cover 78 between end collars 79. In this embodiment, the periphery of ribbon or coil 72 is attached to the containment tube 71. Magnets 73 on the outer periphery of containment tube 71 are moved relative to the stators 74 and field coils 75 that are fixed on a stationary mounting tube 76 between end collars 79 so as to generate electricity. The relative arrangement is disclosed in more detail in FIG. 7B. Preferably, magnetic bearings 77 between the ends of the containment tube 71 and the end collars 79 are used to rotationally support the coil 72, tube 71, and magnets 73, as illustrated in more detail in FIG. 7C. The space between tube 71 and cover 78 can be filled with lubricant, coolant, sealant gases, or the fluid flowing through tube 71.

This embodiment is useful for fixed applications since the outside of the unit is meant to be fixed, and is generally more suited to use mounted in-line with conduits and pipes since it does not restrict the flow at the outlet as do embodiments such as the one illustrated in FIGS. 6A-6C. In a related embodiment, elements 74, 75, and 76 can be mounted on the outside of a pipe or tube conveying fluid. Elements 71, 72, 73, 77 and 79 would be mounted inside said pipe or tube serving as a conduit for fluid. Fluid passing through 71 and 72 would cause their rotation, as previously described.

Figure 8B:
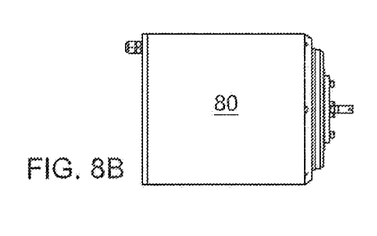

FIG. 8A illustrates an exploded cross-section of an embodiment of a water tight power management assembly (PMA) unit 80, and FIG. 8B illustrates the PMA 80 in an assembled, watertight state.

PMA 80 includes a magnetic clutch that has an outside magnetic coupler assembly 824 that couples to the shaft of a rotating ribbon or coil (not shown) so to convert the rotational movement of the shaft into electrical power in the AMA 80. A bearing on the outside magnetic coupler assembly 824 mounts to an outer bearing flange 828' on forward housing plate 822. A bearing on the inside magnetic coupler assembly 826 mounts to a inner bearing flange 828 on forward housing plate 822. Collectively, the forward housing plate 822 and the two magnetic coupler assemblies 824 and 826 are used to form a magnetic clutch for the PMA 80.

The inner magnetic coupler assembly 826 is coupled to a spur gear assembly 832 that interacts with a interchangeable pulley ratio assembly 834 so as to provide a reduction gear means for the PMA 80 that allows for interchangeable gear ratios so that the PMA 80 can be operated efficiently. The pulley on interchangeable pulley ratio assembly 834 transfers rotational power to a corresponding pulley on the driveshaft of a generator or alternator (permanent magnet or otherwise) 840 with a suitable drive belt (not illustrated). Alternately, assembly 834 can be a continuously-variable transmission (CVT) providing variable gear ratios.

The, e.g., alternator 840 is sealed in a watertight manner inside of a generally-cylindrical outer housing 852 that is sealed at a forward end with forward housing plate 822 and sealed at a rearward end with aft housing plate 854. Alternatively, the supportive housing plate can be located forward of the alternator. A watertight power cable plug 858 in aft housing plate 854 is used to allow a power cable (not illustrated) to carry the electricity generated by alternator 840 to another location for use or storage in a battery. The outer housing 852 preferably includes cooling tubes 856 to remove undesirable heat away from the alternator 840 during use.

The PMA unit 80 effectively provides a generator unit with both a magnetic clutch and a variable gear reduction mechanism so as to provide numerous benefits in a ribbon drive electrical power generator system or method. Use of a magnetic clutch eliminates having a continuous shaft directly from the end of the rotating ribbon or coil to the gear reduction mechanism associated with the alternator/generator. By eliminating the shaft, one can avoid having to use a tight bearing assembly to prevent fluid leakage into the alternator/generator housing that is directly in line with the ribbon or coil assembly. If a continuous shaft was used with water-tight bearings, the torque effort needed for the breakaway torque would be markedly increased and there would be significant ongoing frictional losses during shaft rotation.

Utilization of a magnetic clutch, with each half consisting of a round metal or polymer part with holes therein for the insertion of small permanent magnets, allows rotary energy of the forward shaft (continuous with the rotating ribbon or coils) to be transmitted to the separate rearward shaft contained with the reduction gearing, belts, and the alternator/generator and its shaft, housed in the watertight rearward metal or polymer canister. Each half of the magnetic clutch (i.e. magnetic coupler assembly) is on either side of, but not touching, a thin non-magnetic (i.e., aluminum or the like) plate that is part of the alternator/generator watertight canister.

The number of magnets in each half of the magnetic clutch can be adjusted so that when the R.P.M.'s or torque of the clutch reach a certain level, the clutch will begin to slip, thus preventing the alternator/generator unit from over-revving beyond a predetermined rotational or torque limit that would potentially damage the reduction gears, bearings, or belts, or the alternator/generator unit, whether by overheating or by premature wear of the bearings in the alternator/generator unit or by other means, any of which would decrease alternator/generator effectiveness, burn out the stator coils, or otherwise shorten its life cycle.

Utilization of the magnetic clutch can also eliminate the friction and the mass or inertia of other types of connections between alternator/generator and the ribbon or coil rotating mechanism, which types include but are not limited to a long axle associated with angled gearing to an alternator/generator located in a dry location above or to the side of the turbine mechanism, heavy gearing associated therewith, or to a drive belt(s) connecting the turbine shaft or housing which are in a water flow, to the alternator/generator which is not in the water.

Furthermore, use of a reduction gearing mechanism allows for easy adaptation of the ribbon or coil to differing rates of fluid or water flow or different water head at various sites or installations in order to match the desired performance curve, by enabling the relatively simple substitution of one set of gears with other sets (e.g., "swapping out", switching only the gears and belts) so as to alter the output-to-input gear ratio from, e.g., 2:1 to 0.5:1 (although these ratios are not meant to be limiting).

It may also be desirable to create a dual-use application of the power generation apparatus by adapting an alternator/generator unit which can be run in reverse by applying an electric current to its terminals, in order to convert its function to that of a motor, such as for powering marine propulsion or pumping of fluid). For example, the entire unit may alternately be oriented so that the watertight PMA containing the motor (alternator) to be energized is oriented to the front of a marine vessel, canal boat or barge, or personal water sled or runabout, and the former ribbon or coil entry becomes the water exit. A hydrodynamic bubble or form can be attached to the now frontward-facing motor module. Alternatively, the PMA containing the alternator/generator can be disconnected as a single unit and replaced with a motor and gearing and magnetic clutch inside a watertight canister with the correct size and dimensions to fit where previously the alternator/generator had been located.

In a related fashion, a ribbon drive electrical power generation apparatus can be made by converting a ribbon drive propulsion apparatus via reversing the orientation in flowing water, or with water conducted to the new entry end; using an electric motor that has been chosen for possible reversal of the power leads such that the propulsor now becomes a power generation unit. The spinning ribbon or coil vane component can be replaced with another one containing different angle or pitch to the coils in the vane[s], to achieve different performance characteristics.

In use, various embodiments can have application for use in: rivers or streams, bay currents, ocean currents, dams, marinas, vessels docked or moored or at sea, use with hydrokinetic systems extracting energy from wave or tidal action, summer homes or camping near flowing water, remote monitoring for meteorological or military or pipeline observational and other reporting purposes, emergency power for vessels stranded underwater or otherwise rendered motionless, downspouts, water fountains, shower heads, cardiovascular installation in a living being to provide electric current for various internal applications, milking machines, manufacturing processes using moving or recirculating fluids, pumping water into oil wells to reclaim more oil or fill voids, rooftop water towers, downpipes, replacement or supplementation of pressure relief valves inside water systems of multi-level buildings, operating by virtue of passage of compressed or supercold liquids such as methane or nitrogen (including extraterrestrial applications), and miniaturized micro circuitry where a flowing liquid can initiate miniscule ribbon drives to produce a small electric current to throw a switch/alter flow through different circuits. Said fluids may be electro-luminescent when an electric current is added, and color shown and its intensity may change depending on internal or other applied pressure changes. Parallel or intertwining of counter-directional power generation apparatus units may be employed in measurement scenarios or in intentionally fluctuating electric current scenarios as in motive, medical, stabilizing or gyroscopic applications.

Additionally, embodiments can be used to bleed very small amounts of energy from existing fluid systems to provide small amounts of electricity that are typically provided by sources such as batteries. In this manner, remote monitoring equipment such as flow rate monitors can be powered by the fluid or a branched portion of the fluid when the fluid is flowing. When incorporated at water or other fluid outlets such as, but not limited to shower heads, outside water faucets, and water fountains, the generator can be used to generate limited amounts of electricity for purposes such as generating electricity to light a shower stall, power nearby fans or radios, or provide lighting displays for public water fountains, respectively.

The apparatus and method can be employed in a variety of sizes based on the particular space or configuration restrictions of the area(s) in which it would be employed. The apparatus could also be employed in a variety of teaming arrangements in pairs, threes, fours, and so forth as well as in parallel or series based on the specific requirements of a particular installation. This flexibility allows power generation efforts to be employed in situations not ordinarily considered for power generation.

A system and method for ribbon drive electrical power generation has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

I claim:

1. A ribbon drive power generation method comprising:
   providing a substantially constant diameter stationary outer containment tube having an inner wall, an outer wall, an intake at a first end, and an outlet at a second end;
   passing a fluid through the outer containment tube for rotating at least one ribbon extending radially inward from an outer peripheral edge a length less than a radius of the outer containment tube to form a central axial opening in the ribbon;
   providing a rigid central tube attached to an inner edge of the ribbon;
   providing at least one magnet attached to the outer peripheral edge of the ribbon;
   providing at least one stator and at least one field coil attached to the outer wall of the outer containment tube; and
   generating electricity from the rotation of the ribbon within the outer containment tube via the movement of the magnet relative to the stator and field coil,
   wherein the ribbon is located entirely within the outer containment tube in a longitudinal direction, and is formed of coils extending in a helical manner from the first end to the second end of the outer containment tube, and
   wherein a frequency of coils per unit length of outer containment tube increases from the first end to the second end of the outer containment tube.

2. The ribbon drive power generation method of claim 1, wherein the fluid passed through the outer containment tube is selected from the group consisting of water, hydrocarbons, fuels, milk, whey, blood, blood plasma, silicone, mercury, slurries, electroluminescent liquids, and fluids that are liquids only when pressurized.

3. The ribbon drive power generation method of claim 1, wherein the field of use is selected from the group consisting of use in: rivers or streams, tidal flows, bay currents, ocean currents, hydrokinetic wave applications, dams, marinas, vessels docked or moored or at sea, summer homes or camping near-flowing water, remote monitoring for seismic, meteorological or military or pipeline observational and reporting purposes, emergency power for vessels stranded underwater or otherwise rendered motionless, water fountains, shower heads, cardiovascular installation in a living being to provide electric current for various internal applications, milking machines, manufacturing processes using moving or recirculating fluids, pumping water into oil wells to reclaim more oil or fill underground voids, emptying or refilling quarries, rooftop water towers, water piping in tall buildings, replacement or supplementation of pressure relief valves inside conduits or water systems of multi-level buildings, operating by virtue of passage of compressed or supercold liquids such as methane or nitrogen, extraterrestrial applications, and miniaturized micro circuitry where a flowing liquid can initiate miniscule ribbon drives to produce a small electric current to throw a switch/alter flow through different circuits.

4. The ribbon drive power generation method of claim 1, further comprising providing a plurality of ribbons equally spaced in relation to an interior circumference of the outer containment tube.

5. The ribbon drive power generation method of claim 1, wherein the ribbon is cupped to have a concave curvature in a direction facing the intake.

6. A ribbon drive power generation apparatus comprising:
a containment tube having a substantially constant diameter, an intake at a first end, and an outlet at a second end;
at least one ribbon attached to an inner periphery of the containment tube and extending radially inward from an outer peripheral edge a length less than the radius of the containment tube to form a central axial opening in the ribbon configured to enable fluid to pass through the containment tube, the ribbon located entirely within the containment tube in a longitudinal direction, and formed of coils extending in a helical manner from the first end to the second end of the containment tube, wherein a frequency of coils per unit length of containment tube increases from the first end to the second end of the containment tube;
at least one magnet attached to an outer periphery of the containment tube; and
means for obtaining power from rotation of the ribbon, magnet, and containment tube so as to generate power from fluid moving from the first end to the second end of the containment tube.

7. The ribbon drive power generation apparatus of claim 6, wherein the containment tube comprises peripheral rings having a substantially constant diameter.

8. The ribbon drive power generation apparatus of claim 6, wherein the means for obtaining power from rotation of the ribbon, magnet, and containment tube so as to generate power from fluid moving from the first end to the second end further comprises a means for obtaining power from the movement of the magnet relative to at least one stator and at least one field coil.

9. The ribbon drive power generation apparatus of claim 8, further comprising a hollow rigid central tube attached to an inner edge of the ribbon.

10. The ribbon drive power generation apparatus of claim 8, wherein the hollow rigid central tube is a porous hollow rigid central tube.

11. The ribbon drive power generation, apparatus of claim 6, further comprising a plurality of ribbons equally spaced on an interior circumference of the containment tube.

12. The ribbon drive power generation apparatus of claim 6, wherein the ribbon is cupped to have a concave curvature in a direction facing the intake.

13. A ribbon drive power generation method comprising:
providing a substantially constant diameter containment tube having an inner surface, an outer surface, an intake at a first end, and an outlet at a second end;
passing a fluid through the containment tube for rotating at least one ribbon attached to the inner surface of the containment tube and extending radially inward from an outer peripheral edge a length less than a radius of the containment tube to form a central axial opening in the ribbon configured to enable the fluid to pass through the containment tube;
providing at least one magnet attached to the outer surface of the containment tube;
generating electricity from the rotation of the ribbon and the containment tube via the movement of the magnet;
wherein the ribbon is located entirely within the containment tube in a longitudinal direction, and is formed of coils extending in a helical manner from the first end to the second end of the containment tube, and
wherein a frequency of coils per unit length of containment tube increases from the first end to the second end of the containment tube.

14. The ribbon drive power generation method of claim 13, further comprising providing at least one stator and at least one field coil,
wherein generating electricity from the rotation of the ribbon and the containment tube via the movement of the magnet further comprises generating electricity from the rotation of the ribbon and the containment tube via the movement of the magnet relative to at least one stator and at least one field coil.

15. The ribbon drive power generation method of claim 13, wherein the fluid passed through the containment tube is selected from the group consisting of water, hydrocarbons, fuels, milk, whey, blood, blood plasma, silicone, mercury, slurries, electroluminescent liquids, and fluids that arc liquids only when pressurized.

16. The ribbon drive power generation method of claim 13, wherein the field of use is selected from the group consisting of use in: rivers or streams, tidal flows, bay currents, ocean currents, hydrokinetic wave applications, dams, marinas, vessels docked or moored or at sea, summer homes or camping near flowing water, remote monitoring for seismic, meteorological or military or pipeline observational and reporting purposes, emergency power for vessels stranded underwater or otherwise rendered motionless, water fountains, shower heads, cardiovascular installation in a living being to provide electric current for various internal applications, milking machines, manufacturing processes using moving or recirculating fluids, pumping water into oil wells to reclaim more oil or fill underground voids, emptying or refilling quarries, rooftop water towers, water piping in tall buildings, replacement or supplementation of pressure relief valves inside conduits or water systems of multi-level buildings, operating by virtue of passage of compressed or supercold liquids such as methane or nitrogen, extraterrestrial applications, and miniaturized micro circuitry where a flowing liquid can initiate miniscule ribbon drives to produce a small electric current to throw a switch/alter flow through different circuits.

17. The ribbon drive power generation method of claim 13, further comprising providing a plurality of ribbons equally spaced on an interior circumference of the containment tube.

18. The ribbon drive power generation method of claim 13, wherein the ribbon is cupped to have a concave curvature in a direction facing the intake.

19. A ribbon drive power generation apparatus comprising:
an external mounting tube;
at least one stator and at least one field coil coupled to the external mounting tube;
a containment tube having a substantially constant diameter, an intake at a first end, and an outlet at a second end, the containment tube rotationally supported within the external mounting tube;
at least one ribbon attached to an inner periphery of the containment tube and extending radially inward from an outer peripheral edge a length less than the radius of the containment tube to form a central axial opening in the ribbon configured to enable fluid to pass through the containment tube, the ribbon located entirely within the containment tube in a longitudinal direction, and formed of coils extending in a helical manner from the first end to the second end of the containment tube, wherein a frequency of coils per unit length of containment tube increases from the first end to the second end of the containment tube; and at least one magnet attached to an outer periphery of the containment tube, wherein the magnet, the stator, and the field coil are arranged such that rotation of the ribbon, magnet, and containment tube within the external mounting tube generates electricity.

20. The ribbon drive power generation apparatus of claim 19, further comprising a hollow rigid central tube attached to an inner edge of the ribbon.

21. The ribbon drive power generation apparatus of claim 20, wherein the hollow rigid central tube is a porous hollow rigid central tube.

22. The ribbon drive power generation apparatus of claim 19, further comprising a plurality of ribbons equally spaced on an interior circumference of the containment tube.

23. The ribbon drive power generation apparatus of claim 19, wherein the ribbon is cupped to have a concave curvature in a direction facing the intake.

24. A ribbon drive power generation method comprising:

providing an external mounting tube, at least one stator and at least one field coil coupled to the external mounting tube;

providing a substantially constant diameter containment tube having an inner wall, an intake at a first end, and an outlet at a second end, the containment tube rotationally supported within the external mounting tube;

passing a fluid through the containment tube for rotating at least one ribbon attached to an inner periphery of the containment tube and extending radially inward from an outer peripheral edge a length less than a radius of the containment tube to form a central axial opening in the ribbon configured to enable the fluid to pass through the containment tube;

providing at least one magnet attached to an outer periphery of the containment tube; and generating electricity from the rotation of the ribbon, magnet, and containment tube within the external mounting tube via the movement of the magnet relative to the stator and field coil, wherein the ribbon is located entirely within the containment tube in a longitudinal direction, and is formed of coils extending in a helical manner from the first end to the second end of the containment tube, and wherein a frequency of coils per unit length of containment tube increases from the first end to the second end of the containment tube.

25. The ribbon drive power generation method of claim 24, further comprising providing a hollow rigid central tube attached to an inner edge of the ribbon.

26. The ribbon drive power generation method of claim 25, wherein the hollow rigid central tube is a porous hollow rigid central tube.

27. The ribbon drive power generation method of claim 24, wherein the fluid passed through the containment tube is selected from the group consisting of water, hydrocarbons, fuels, milk, whey, blood, blood plasma, silicone, mercury, slurries, electroluminescent liquids, and fluids that are liquids only when pressurized.

28. The ribbon drive power generation method of claim 24, wherein the field of use is selected from the group consisting of use in: rivers or streams, tidal flows, bay currents, ocean currents, hydrokinetic wave applications, dams, marinas, vessels docked or moored or at sea, summer homes or camping near flowing water, remote monitoring for seismic, meteorological or military or pipeline observational and reporting purposes, emergency power for vessels stranded underwater or otherwise rendered motionless, water fountains, shower heads, cardiovascular installation in a living being to provide electric current for various internal applications, milking machines, manufacturing processes using moving or recirculating fluids, pumping water into oil wells to reclaim more oil or fill underground voids, emptying or refilling quarries, rooftop water towers, water piping in tall buildings, replacement or supplementation of pressure relief valves inside conduits or water systems of multi-level buildings, operating by virtue of passage of compressed or supercold liquids such as methane or nitrogen, extraterrestrial applications, and miniaturized micro circuitry where a flowing liquid can initiate miniscule ribbon drives to produce a small electric current to throw a switch/alter flow through different circuits.

29. The ribbon drive power generation method of claim 24, further comprising providing a plurality of ribbons equally spaced on an interior circumference of the containment tube.

30. The ribbon drive power generation method of claim 24, wherein the ribbon is cupped to have a concave curvature in a direction facing the intake.

* * * * *